(12) United States Patent
Meidinger et al.

(10) Patent No.: US 10,377,572 B1
(45) Date of Patent: Aug. 13, 2019

(54) MOVEABLE INTEGRATED SIDE GUIDE AND ROLLER TRAY ASSEMBLY FOR CARGO MANAGEMENT SYSTEM

(71) Applicant: GOODRICH CORPORATION, Charlotte, NC (US)

(72) Inventors: Joshua Ryan Meidinger, Jamestown, ND (US); Wallace Harold Larson, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/165,107

(22) Filed: Oct. 19, 2018

(51) Int. Cl.
 *B65G 13/11* (2006.01)
 *B64D 9/00* (2006.01)
 *B65G 21/20* (2006.01)

(52) U.S. Cl.
 CPC ............. *B65G 13/11* (2013.01); *B64D 9/00* (2013.01); *B65G 21/2072* (2013.01); *B64D 2009/006* (2013.01)

(58) Field of Classification Search
 CPC ....... B65G 13/11; B65G 21/2072; B64D 9/00
 USPC .............................. 193/35 C; 198/836.1, 837
 See application file for complete search history.

(56) References Cited

U.S. PATENT DOCUMENTS

| | | | |
|---|---|---|---|
| 3,251,489 A | 5/1966 | Davidson | |
| 4,875,645 A | 10/1989 | Courter | |
| 4,898,284 A * | 2/1990 | Arens | A47F 5/08 211/162 |
| 5,311,979 A * | 5/1994 | Risley | B65G 21/2054 198/453 |
| 6,196,375 B1 * | 3/2001 | Cozza | B65G 21/2054 193/350 |
| 7,556,462 B2 * | 7/2009 | Huber | B64C 1/20 410/77 |
| 7,650,983 B2 * | 1/2010 | Marsetti | B65G 21/2054 198/452 |
| 7,850,000 B2 * | 12/2010 | Andreoli | B65G 21/2054 198/836.1 |
| 8,348,048 B2 * | 1/2013 | DeAngelis | B65G 19/30 198/779 |
| 8,387,919 B2 * | 3/2013 | Huber | B64C 1/20 244/118.1 |
| 8,573,379 B2 * | 11/2013 | Brugmann | A47F 1/125 193/35 C |
| 9,422,110 B2 * | 8/2016 | Marsetti | B65G 21/2054 |
| 10,040,635 B2 * | 8/2018 | Stefanko | B65G 17/40 |

FOREIGN PATENT DOCUMENTS

CN 105818987 7/2018

* cited by examiner

*Primary Examiner* — Douglas A Hess
(74) *Attorney, Agent, or Firm* — Snell & Wilmer, L.L.P.

(57) ABSTRACT

An integrated side guide roller tray assembly for a cargo management system may comprise a guide rail. A first end mounting bracket may be coupled to a first end of the guide rail. A second end mounting bracket may be coupled to a second end of the guide rail opposite the first end. A roller tray including a roller may be coupled to the first end mounting bracket.

17 Claims, 8 Drawing Sheets

MOVEABLE INTEGRATED SIDE GUIDE AND ROLLER TRAY ASSEMBLY FOR CARGO MANAGEMENT SYSTEM

FIELD

The present disclosure relates generally to cargo management systems, and more specifically, to moveable integrated side guide and roller tray assemblies for cargo management systems.

BACKGROUND

Cargo management systems, such as those used by aircraft for transport of containerized cargo or pallets, also referred to as unit load devices (ULDs), typically include roller trays containing transport rollers positioned along a cargo bay floor to facilitate movement of the ULDs relative to the bay floor. The cargo management systems may include a side guide (or rail) configured to guide and/or restrain movement of ULDs through the cargo bay. Conventional systems are typically designed to accommodate a particular ULD size with the roller trays installed in fixed positions. When the side guides are repositioned to accommodate different sized ULDs, the roller trays may not be in a position to provide support and conveyance to the outboard edge of the ULDs.

SUMMARY

An integrated side guide roller tray assembly for a cargo management system is disclosed herein. In accordance with various embodiments, the integrated side guide roller tray assembly may comprise a guide rail, a first end mounting bracket coupled to a first end of the guide rail, and a second end mounting bracket coupled to a second end of the guide rail opposite the first end. A first roller tray may be coupled to the first end mounting bracket and may comprise a first roller.

In various embodiments, a mid-mounting bracket may be coupled to the first roller tray and the guide rail. The mid-mounting bracket may be located half-way between the first end mounting bracket and the second end mounting bracket. In various embodiments, a second roller tray may be coupled to the second end mounting bracket and the mid-mounting bracket. The second roller tray may comprise a second roller.

In various embodiments, the first end mounting bracket may define a first keyhole, and the second end mounting bracket may define a second keyhole.

In various embodiments, the first end mounting bracket may comprise a locking system. The locking system may include a plunger configured to translate relative to the first end mounting bracket and in a direction parallel to the guide rail. In various embodiments, the locking system may further comprise a spring configured to apply a biasing force to the plunger, and a lever operationally coupled to the plunger. The lever may be configured such that actuation of the lever translates the plunger.

In various embodiments, the first roller tray may comprise an outer rail and an inner rail. In various embodiments, a securement pin may couple the first roller tray to the first end mounting bracket. The securement pin may comprise a shaft portion and a lip portion. The shaft portion may be located through the outer rail of the first roller tray, the inner rail of the first roller tray, and a flange of the first end mounting bracket. The lip portion may be located through the outer rail of the first roller tray and on a surface of the outer rail that is oriented toward the inner rail.

A cargo management system is also disclosed herein. In accordance with various embodiments, the cargo management system may comprise a first track, a second track parallel to the first track, and a first integrated side guide roller tray assembly extending between the first track and the second track. The first integrated side guide roller tray assembly may comprise a first guide rail and a first end mounting bracket coupled to a first side of the first track and to a first end of the first guide rail. A second end mounting bracket may be coupled to a first side of the second track and to a second end of the first guide rail opposite the first end of the first guide rail. A first roller tray may be coupled to the first end mounting bracket and may comprise a first roller.

In various embodiments, a third track may be parallel to the first track and the second track, and a second integrated side guide roller tray assembly may extend between the first track and the third track. The second integrated side guide roller tray assembly may comprise a second guide rail and a right end mounting bracket coupled to a first end of the second guide rail and to a second side of the first track opposite the first side of the first track. A left end mounting bracket may be coupled to a first side of the third track and to a second end of the second guide rail opposite the first end of the second guide rail. A second roller tray may be coupled to the right end mounting bracket and may comprise a second roller.

In various embodiments, a first protrusion may extend from the first side of the second track and may be located through a first keyhole defined by the first end mounting bracket of the first integrated side guide roller tray assembly. A second protrusion may extend from the second side of the first track and may be located through a keyhole defined by the right end mounting bracket of the second integrated side guide roller tray assembly.

In various embodiments, a third track may be parallel to the first track and may be located between the first track and the second track. The first integrated side guide roller tray assembly may further comprise a mid-mounting bracket coupled to the first roller tray and to the third track. In various embodiments, a first protrusion may extend from a first side of the third track and may be located through a first keyhole defined by the mid-mounting bracket. A second protrusion may extend from a second side of the third track opposite the first side of the third track. The second protrusion may be located through a second keyhole defined by the mid-mounting bracket.

In various embodiments, the first integrated side guide roller tray assembly may further comprise a second roller tray, including a second roller, coupled to the second end mounting bracket and the mid-mounting bracket.

In various embodiments, the first end mounting bracket may further comprise a locking system. The locking system may include a plunger configured to translate in and out an opening defined by the first track. In various embodiments, the locking system may further comprise a spring configured to apply a biasing force to the plunger, and a lever configured to actuate the plunger.

As disclosed herein, and in accordance with various embodiments, an integrated side guide roller tray assembly may comprise a guide rail, a first mounting bracket coupled to guide rail, and a roller tray coupled to the first mounting bracket and comprising a first roller. The first mounting bracket may define a first keyhole.

In various embodiments, the first mounting bracket may further comprise a locking system. The locking system may include a plunger configured to translate relative to the first mounting bracket.

In various embodiments, a second mounting bracket may be coupled to the guide rail. A third mounting bracket may be coupled to the guide rail and located half way between the first mounting bracket and the second mounting bracket. In various embodiments, a width of the third mounting bracket may be greater than a width of the first mounting bracket.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION OF THE DRAWINGS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Cargo management systems, as disclosed herein, may comprise integrated side guide roller tray assemblies configured to guide and restrain the movement of ULDs or other cargo across the floor or "cargo deck" of an aircraft. In accordance with various embodiments, the location of the integrated side guide roller tray assemblies may be adjusted to accommodate different ULD widths. The integrated side guide roller tray assemblies may include a guide rail and one or more roller trays coupled thereto. The integrated side guide roller tray assemblies may be removably coupled at desired positions along tracks secured to the cargo deck, such that the roller trays and guide rails may be simultaneously repositioned along the tracks. In various embodiments, a locking system may be used to secure the integrated side guide roller tray assemblies to the tracks. In this regard, the integrated side guide roller tray assemblies may be positioned to restrain a ULD of a first width and then secured to the tracks via the locking system. As desired, the locking system may be unlocked, and the integrated side guide roller tray assemblies may be repositioned with respect to the tracks such that a ULD of a second width may be restrained.

Figure 1:
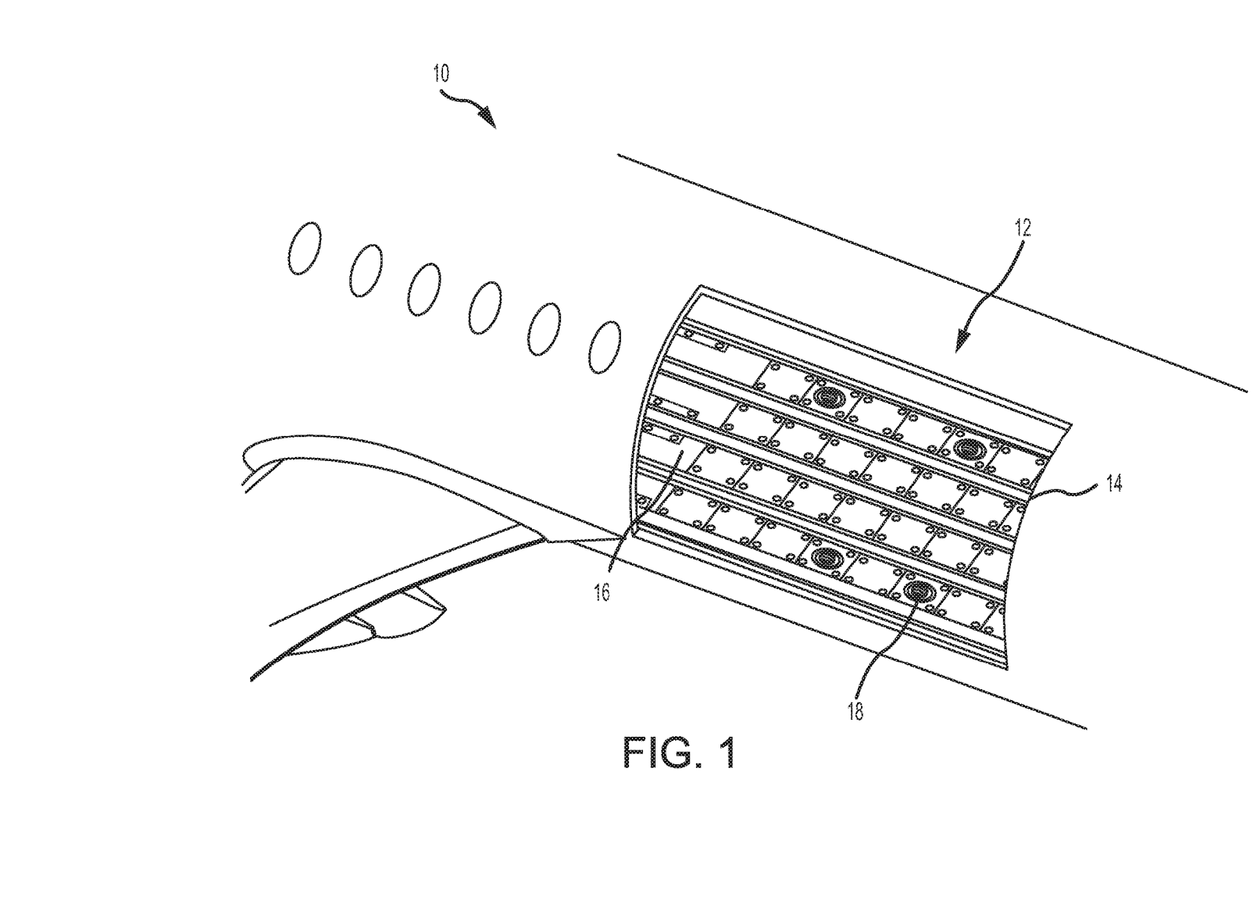
FIG. 1 illustrates a perspective view of an aircraft cargo compartment, in accordance with various embodiments.

With reference to FIG. 1, an aircraft 10 is illustrated having a cargo compartment 12. A cargo door 14 provides access to cargo compartment 12 from outside aircraft 10. Cargo (e.g., pallets or ULDs) may be loaded and unloaded through cargo door 14 and onto cargo deck 16 of aircraft 10. In various embodiments, cargo compartment 12 may be equipped with one or more power drive units (PDUs) 18 configured to propel a ULD across cargo deck 16 in a desired direction.

Figure 2A:
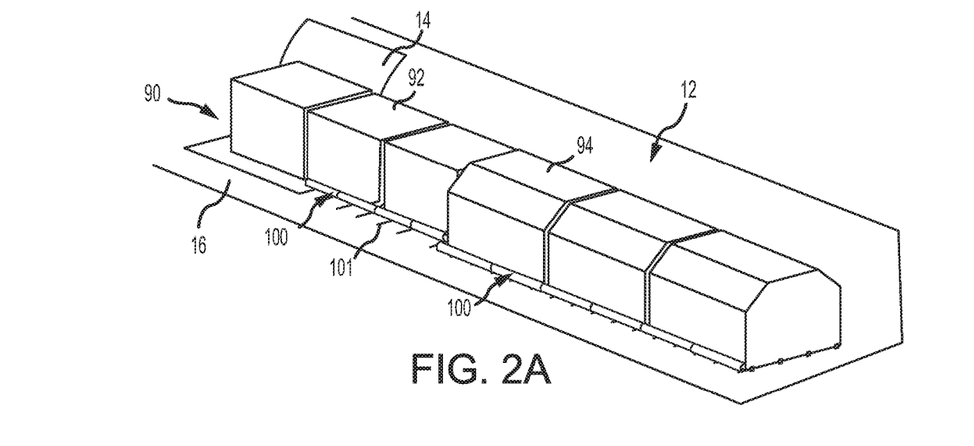
FIGS. 2A and 2B illustrate a perspective view and a top view, respectively, of ULDs of varying width located on a cargo management system, in accordance with various embodiments.

With reference to FIG. 2A, a cargo management system 90, which may be located within cargo compartment 12, is illustrated. In accordance with various embodiments, cargo management system 90 may be used to load, move, and unload cargo (e.g., ULDs 92, 94) within cargo compartment 12. Cargo management system 90 comprises a plurality of tracks 101. Tracks 101 may be secured to cargo deck 16. To facilitate movement of a ULD within the cargo compartment 12, cargo management system 90 may include a number of roller elements, which facilitate rolling movement of the ULDs along cargo deck 16. The roller elements may be part of integrated side guide roller tray assemblies 100 configured to extend longitudinally along a length of cargo deck 16. As discussed in further detail below, integrated side guide roller tray assemblies 100 may be removably coupled to tracks 101. In this regard, integrated side guide roller tray assemblies 100 and the roller elements attached thereto may be moved inward or outward along tracks 101 to accommodate and support ULDs of varying widths.

Figure 2B:
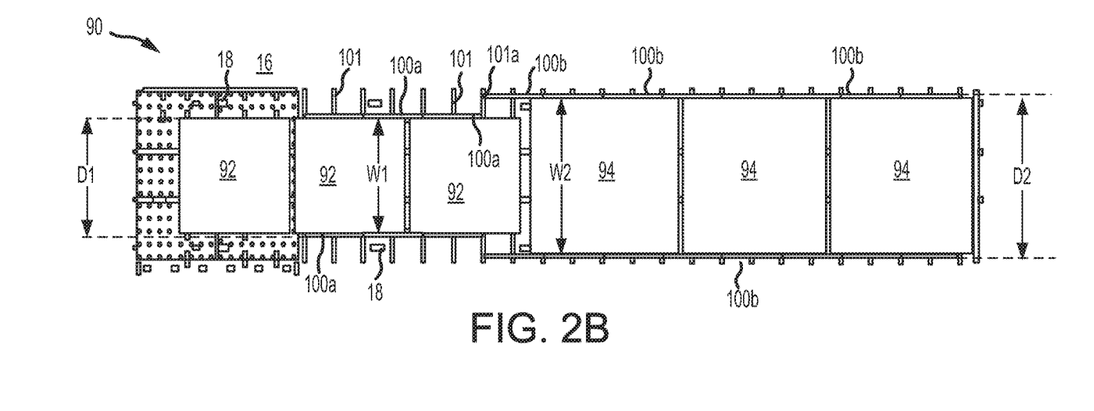

With reference to FIG. 2B, to handle ULDs of varying width, a first group of integrated side guide roller tray assemblies 100a may be positioned in a configuration to accept ULDs 92 having a width W1, and a second group of integrated side guide roller tray assemblies 100b may be positioned in a configuration to accept ULDs 94 having a width W2, which is different (e.g., greater) than width W1. Stated differently, integrated side guide roller tray assemblies 100a may be positioned a distance D1 apart from one another, wherein distance D1 coincides with the width W1 of ULDs 92, and integrated side guide roller tray assemblies 100b may be positioned a distance D2 apart from one another, wherein distance D2 coincides with the width W2 of ULDs 94. Integrated side guide roller tray assemblies 100a, 100b are configured to interact with ULDs 92, 94 to guide, restrain, and/or secure the ULDs 92, 94 within cargo compartment 12. In various embodiments, integrated side guide roller tray assemblies 100a, 100b may be oriented perpendicular to tracks 101, with each integrated side guide roller tray assembly 100a, 100b configured to couple to three adjacent tracks 101. As will be discussed in further detail below, the ends of adjacent integrated side guide roller tray assemblies 100a, 100b may be coupled to opposing sides of the same track 101, such that two integrated side guide roller tray assemblies 100 (e.g., two integrated side guide roller tray assemblies 100a, two integrated side guide roller tray assemblies 100b, or one integrated side guide roller tray assembly 100a and one integrated side guide roller tray assembly 100b) may be coupled to a single track 101.

Figure 3A:
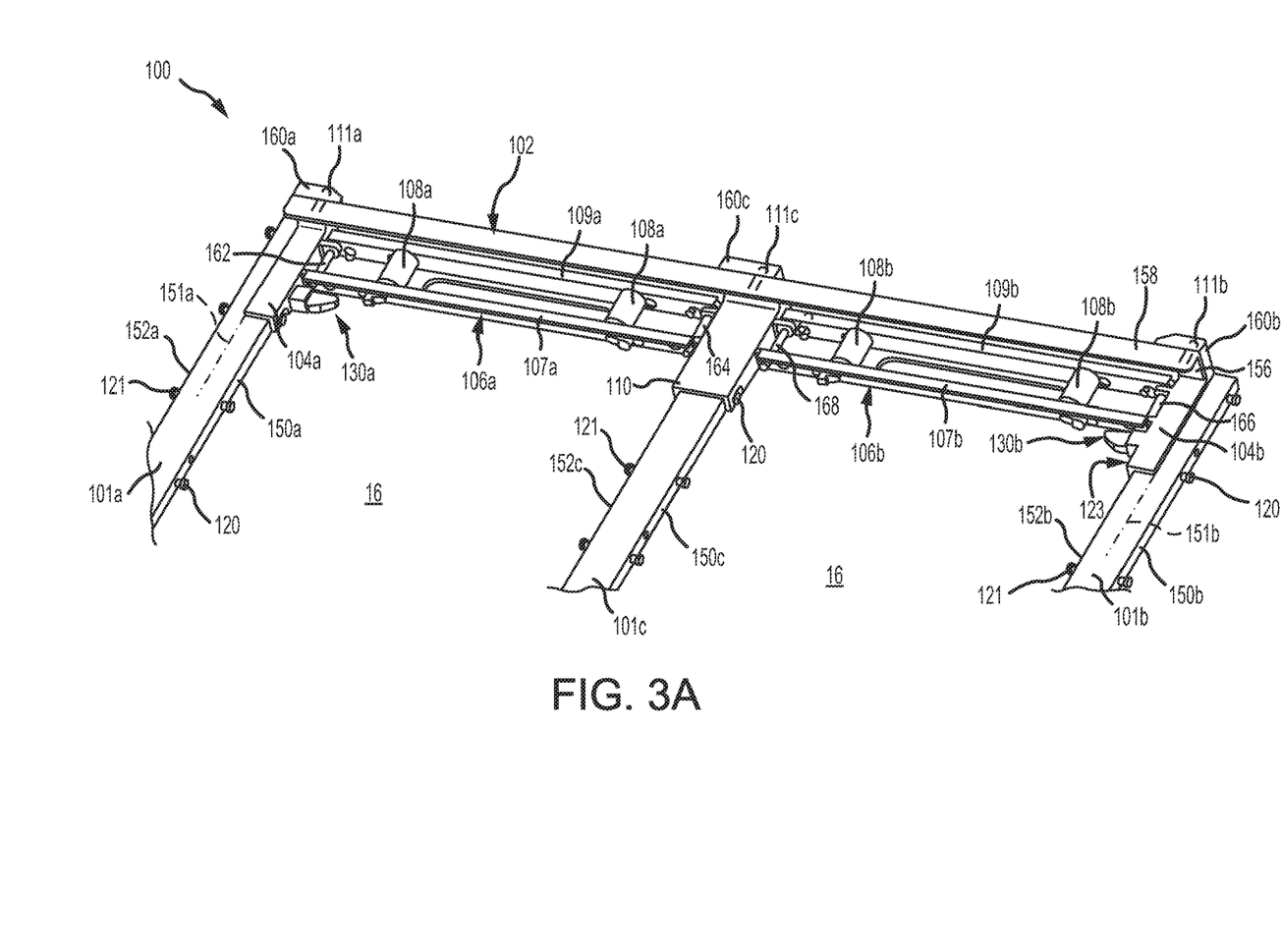
FIG. 3A illustrates a perspective view of an integrated side guide roller tray assembly for a cargo management system, in accordance with various embodiments.

With reference to FIG. 3A, an integrated side guide roller tray assembly 100 of cargo management system 90 is illustrated, in accordance with various embodiments. Integrated side guide roller tray assembly 100 includes a guide rail 102. Guide rail 102 may be configured to restrain and guide movement of cargo (e.g., ULDs 92, 94 in FIG. 2A) within cargo compartment 12. In various embodiments, ULDs 92, 94, with momentary reference to FIG. 2A, may have a groove configured to receive guide rail 102.

Guide rail 102 is coupled to a first (or left) end mounting bracket 104a and to a second (or right) end mounting bracket 104b. First end mounting bracket 104a is removably coupled to a first track 101a. Second end mounting bracket 104b is removably coupled to a second track 101b. First and second tracks 101a, 101b are fixedly attached to cargo deck 16. First end mounting bracket 104a may be configured to extend to, but not beyond, a midpoint 151a of first track 101a. Midpoint 151a is located hallway between a first side 150a and a second side 152b of first track 101a. Second end mounting bracket 104b may be configured to extend to, but not beyond, a midpoint 151b of second track 101b. Midpoint 151b is located hallway between a first side 150b and a second side 152b of second track 101b. In this regard, the first and second end mounting brackets 104a, 104b of adjacent integrated side guide roller tray assemblies 100 may be mounted to one track 101. Stated differently, a left end mounting bracket 104a of a first integrated side guide roller tray assembly 100 may be coupled to first side 150a of first track 101a and a right end mounting bracket 104b of a second integrated side guide roller tray assembly 100 may be coupled to the second 152a side of first track 101a.

Integrated side guide roller tray assembly 100 may further include a mid-mounting bracket 110. Mid-mounting bracket 110 is configured to removable couple to a third track 101c. Third track 101c may be fixedly coupled to cargo deck 16 and may be located between first track 101a and second track 101b. Mid-mounting bracket 110 may be located halfway between first end mounting bracket 104a and second end mounting bracket 104b. Mid-mounting bracket 110 may be configured to extend from first side 150c to second side 152c of third track 101c. In this regard, a width of mid-mounting bracket 110, as measured in direction perpendicular to tracks 101, is greater than a width of first end mounting bracket 104a and a width of second end mounting bracket 104b, as measured in the same direction.

In various embodiments, guide rail 102 may comprise a vertical portion 156 and a horizontal portion 158. As used herein, "vertical" and/or "vertically" refer(s) to a direction perpendicular to cargo deck 16, and "horizontal" and/or "horizontally" refer(s) to a direction parallel to cargo deck 16. In various embodiments, guide rail 102 may be coupled to a vertically extending flange 160a of first end mounting bracket 104a, a vertically extending flange 160b of second end mounting bracket 104b, and/or a vertically extending flange 160c of mid-mounting bracket 110. A fastener 111a may couple vertical portion 156 of guide rail 102 to vertically extending flange 160a. A fastener 111b may couple vertical portion 156 to vertically extending flange 160b. A fastener 111c may couple vertical portion 156 to vertically extending flange 160c. Fasteners 111a, 111b, 111c may comprise screws, nuts and bolts, rivets, clips, or any other securement device.

Integrated side guide roller tray assembly 100 further includes a first roller tray 106a and a second roller tray 106b. First roller tray 106a includes an inner rail 107a, an outer rail 109a, and one or more first rollers (i.e., wheels) 108a located between inner rail 107a and outer rail 109a. First rollers 108a are configured for rotation about an axis, for example, first rollers 108a may each rotate about an axis that is parallel to first track 101a. Outer rail 109a may be located proximate (i.e., closer to) vertical portion 156 of guide rail 102 as compared to inner rail 107a. First roller tray 106a may extend between first end mounting bracket 104a and mid-mounting bracket 110. In various embodiments, inner and outer rails 107a, 109a may be coupled to first end mounting bracket 104a via a securement pin 162 and to mid-mounting bracket 110 via a securement pin 164.

Second roller tray 106b includes an inner rail 107b, an outer rail 109b, and one or more second rollers (i.e., wheels) 108b located between inner rail 107b and outer rail 109b. Second rollers 108b are configured to rotation about an axis (e.g., an axis parallel to second track 101b). Outer rail 109b may be located proximate (i.e., closer to) vertical portion 156 of guide rail 102 as compared to inner rail 107b. Second roller tray 106b may extend between second end mounting bracket 104b and mid-mounting bracket 110. In various embodiments, inner and outer rails 107b, 109b may be coupled to second end mounting bracket 104b via a securement pin 166 and to mid-mounting bracket 110 via a securement pin 168. In various embodiments, first end mounting bracket 104a may include a locking system 130a and second end mounting bracket 104b may include a locking system 130b.

Figure 3B:
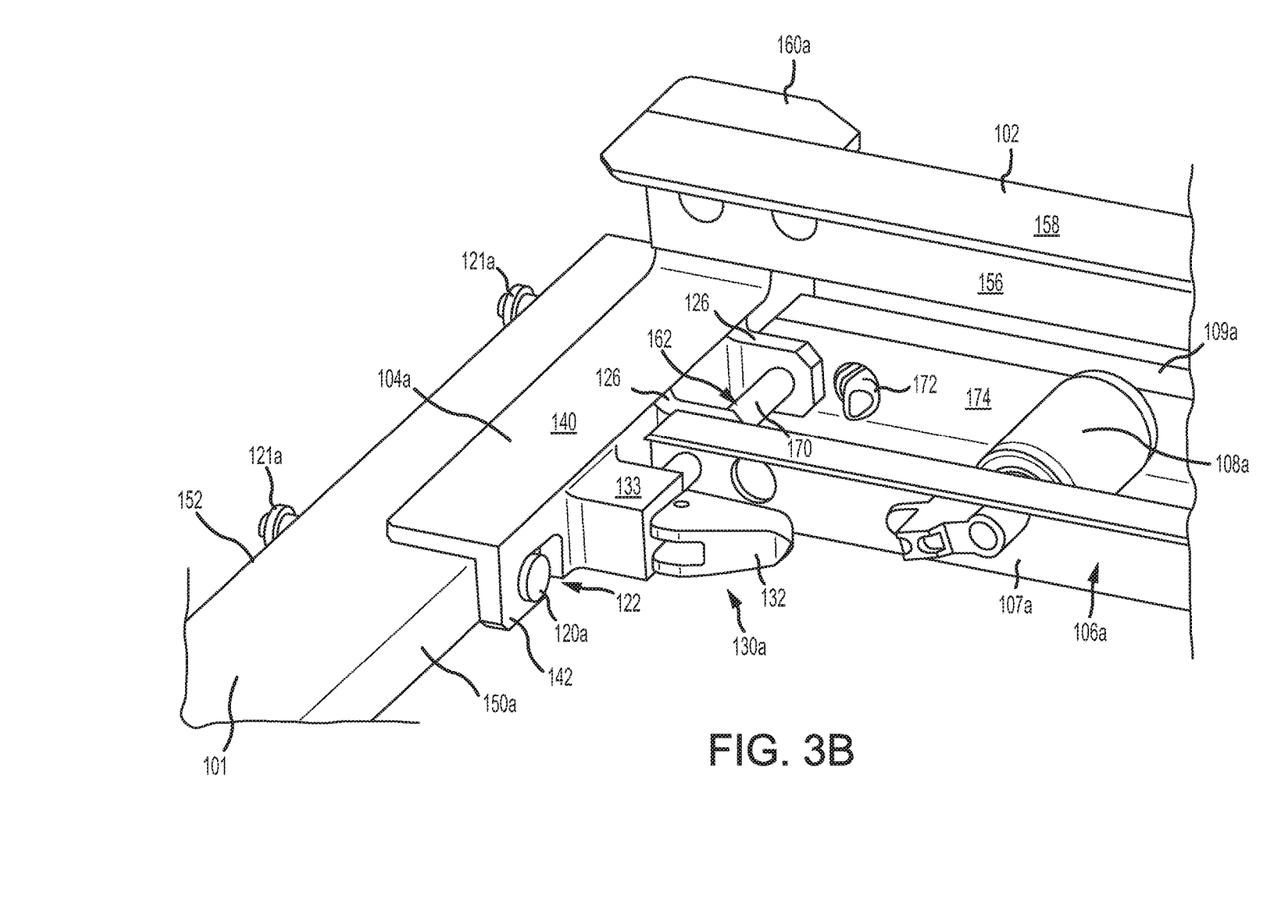
FIG. 3B illustrates a perspective view of an end mounting bracket of the integrated side guide roller tray assembly of FIG. 3A, in accordance with various embodiments.

With reference to FIG. 3B, and continued reference to FIG. 3A, additional details of first end mounting bracket 104a are illustrated, in accordance with various embodiments. It should be understood that second end mounting bracket 104b is substantially a mirror image of first end mounting bracket 104a. Accordingly, it is further contemplated and understood that second end mounting bracket 104b includes the elements and functionalities as described herein with respect to first end mounting bracket 104a.

First end mounting bracket 104a may include a horizontally extending portion 140 and a vertically extending portion 142. Vertically extending portion 142 may be located on and/or in contact with first side 150a of first track 101a. Outer rail 109a and inner rail 107a may be secured to one or more flanges 126 of first end mounting bracket 104a. Flanges 126 may extend horizontally from vertically extending portion 142 of first end mounting bracket 104a. Securement pin 162 may secure outer rail 109a and inner rail 107a to flanges 126.

Figure 6:
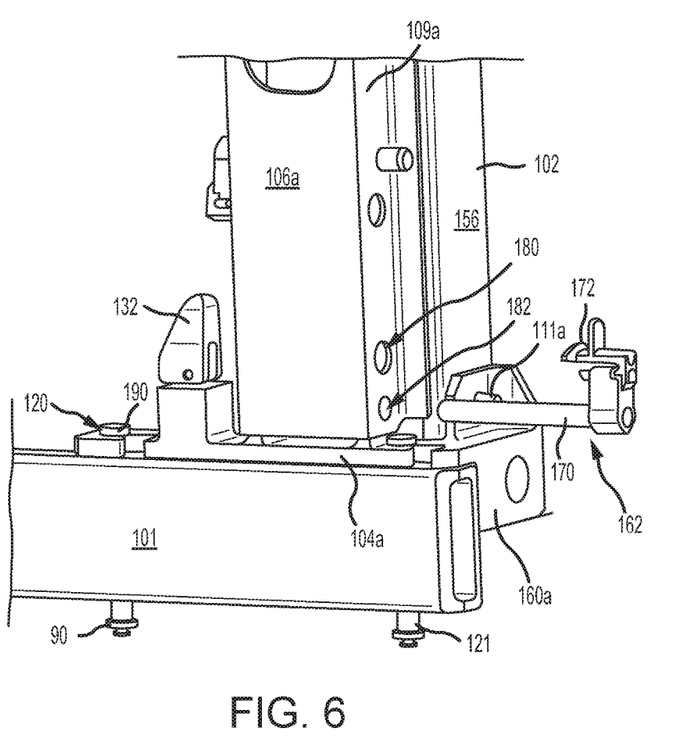
FIG. 6 illustrates a securement pin for attaching a roller tray to an end mounting bracket, in accordance with various embodiments.

With combined reference to FIG. 6 and FIG. 3B, securement pin 162 may include a shaft portion 170 and a lip portion 172. Shaft portion 170 may be located through outer rail 109a, inner rail 107a, and flanges 126. Shaft portion 170 may be inserted through a shaft opening 182 defined by outer rail 109a. Lip portion 172 is configured to be inserted through an opening 180 defined by outer rail 109a. After inserting lip portion 172 into opening 180, lip portion 172 may locate on and/or contact a surface 174 of outer rail 109a. Locating lip portion 172 on surface 174 may prevent securement pin 162 from translating out outer rail 109a, thereby securing first roller tray 106a to first end mounting bracket 104a.

With continued reference to FIG. 3B, first track 101a includes a plurality of first protrusions extending from first surface 150a and a plurality of second protrusions 121 extending from second side 152a. First end mounting bracket 104a may define one or more keyholes 122. In various embodiments, keyholes 122 may be formed through vertically extending portion 142 of first end mounting bracket 104a. Keyholes 122 are configured to receive first protrusions 120.

With momentary combined reference to FIG. 3A and FIG. 3B, second end mounting bracket 104b includes one or more keyholes 123 (similar to keyholes 122) configured to receive second protrusions 121. In various embodiments, midmounting bracket 110 may include a first set of keyholes (similar to keyholes 122) configured to receive first protrusions 120, and a second set of keyholes (similar to keyholes 122) configured to receive second protrusions 121.

First and second protrusions 120, 121 are positioned along tracks 101 to coincide with various ULD widths. In this regard, with momentary combined reference to FIG. 2B and FIG. 3A, integrated side guide roller tray assemblies 100a are secured to first and second protrusions 120, 121 that are located distance D1 apart, and integrated side guide roller tray assemblies 100b are secured to first and second protrusions 120, 121 that are located distance D2 apart. First and second protrusions 120, 121 also allow adjacent integrated side guide roller tray assemblies 100 to be positioned at different locations or widths on the same track 101. For example, a first set of integrated side guide roller tray assemblies 100a may be secured to first track 101a at distance D1 and a second set of integrated side guide roller tray assemblies 100b may be secured to the opposite side of first track 101a at distance D2.

Figure 4A:
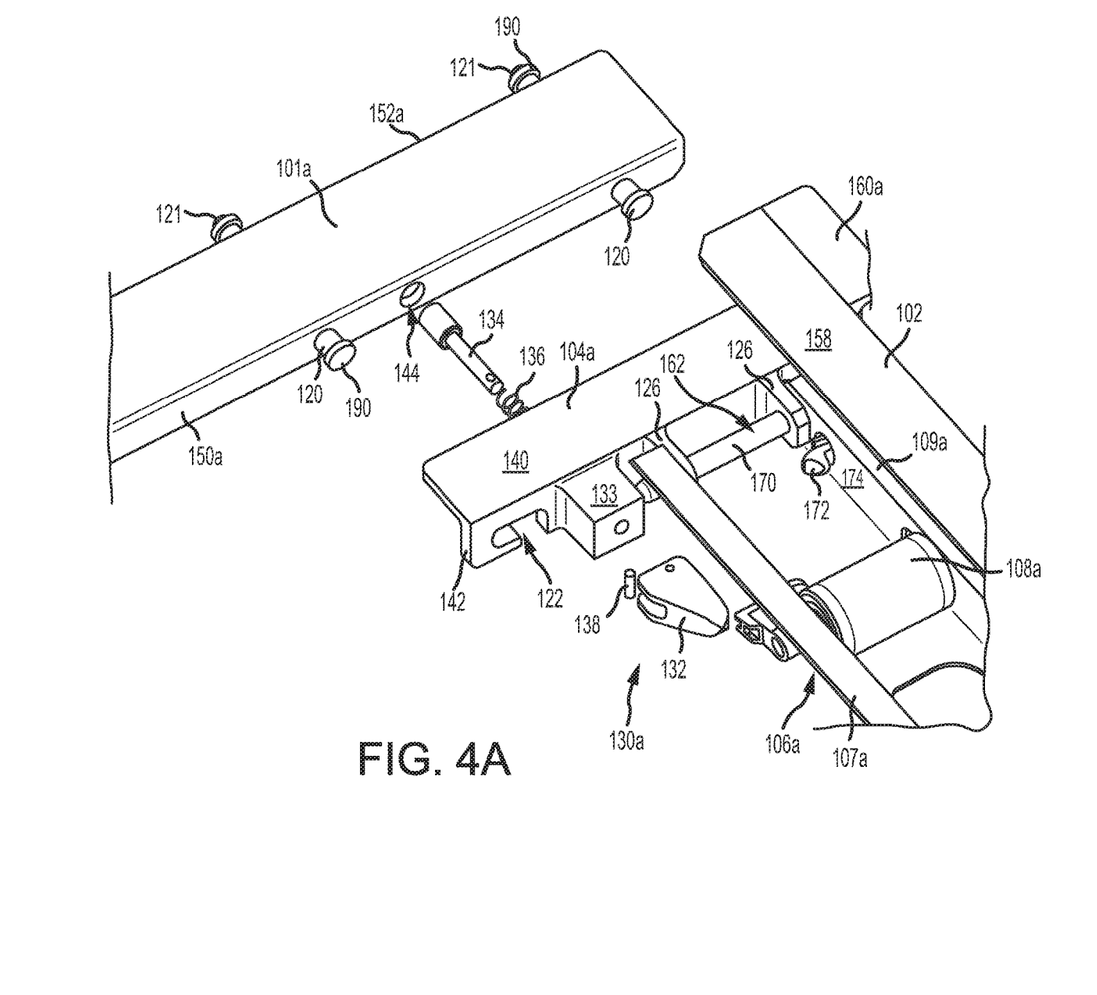
FIGS. 4A and 4B illustrate an exploded top view and an exploded bottom view, respectively, of a locking system of the end mounting bracket of FIG. 3B, in accordance with various embodiments.
Figure 4B:
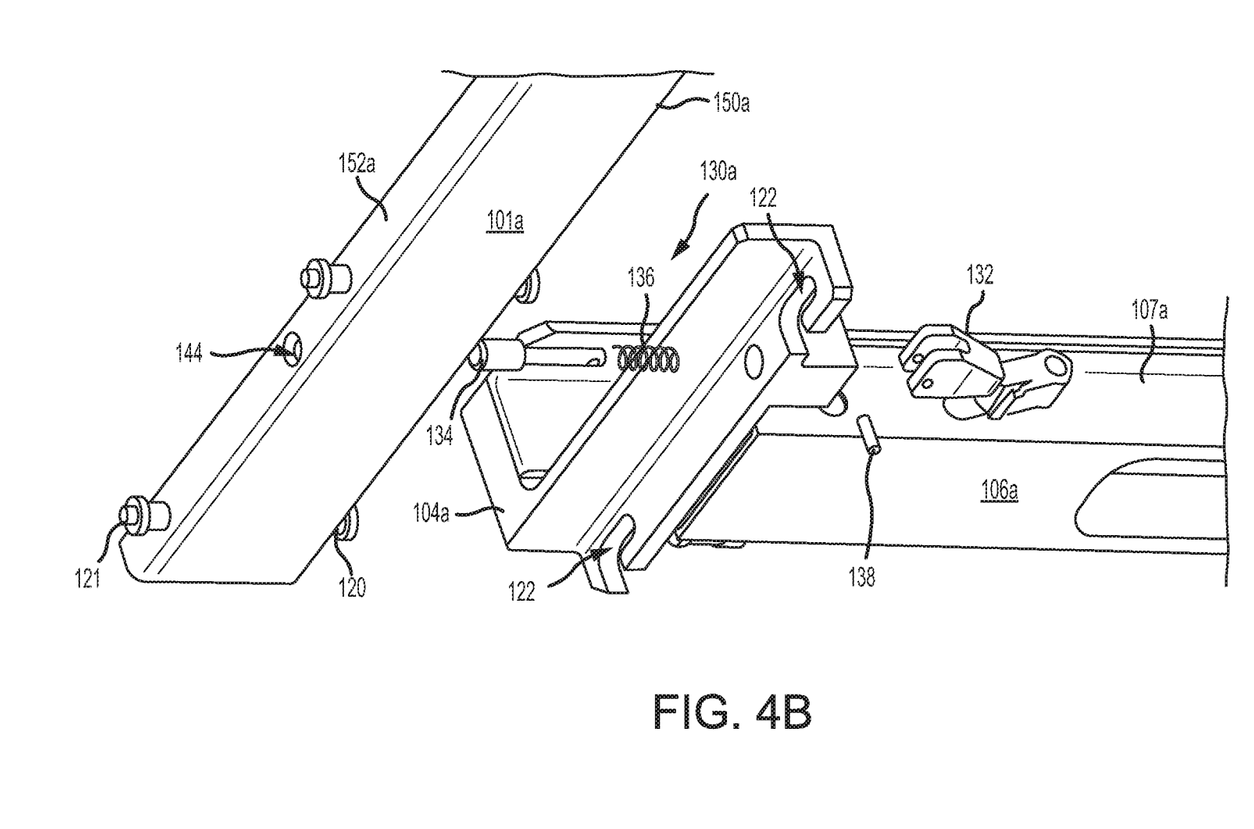

Referring to FIGS. 4A and 4B, first end mounting bracket 104a includes a locking system 130a configured to secure first end mounting bracket 104a to first track 101a. Locking system 130a may include a plunger 134 and a spring 136. Spring 136 may be configured to apply a biasing force to plunger 134. Locking system 130a further includes a lever 132 and a pin 138. Pin 138 may be configured to secure plunger 134 to lever 132. For example, pin 138 may be located through plunger 134 and lever 132. Lever 132 is configured to translate plunger 134 relative to first end mounting bracket 104a and first track 101a. For example, actuation of lever 132 may translate plunger 134 in a direction parallel to guide rail 102 (i.e., perpendicular to first track 101a). Actuation of lever 132 may cause plunger 134 to translate into and out of first track 101a, for example into and out of an opening 144 defined by first track 101a. In various embodiments, at least a portion of plunger 134 and a portion of spring 136 may be located in a spring envelope 133 defined by first end mounting bracket 104a. Lever 132 is configured to translate plunger 134 between a locked position, wherein plunger 134 is located in first track 101a, and an unlocked position, wherein plunger 134 is located outside of first track 101a.

It should be understood that locking system 130b of second end mounting bracket 104b, with momentary reference to FIG. 3A, is a mirror image of locking system 130a. Accordingly, it is further contemplated and understood that locking system 130b includes the elements and functionalities as described herein with respect to locking system 130a.

Figure 5A:
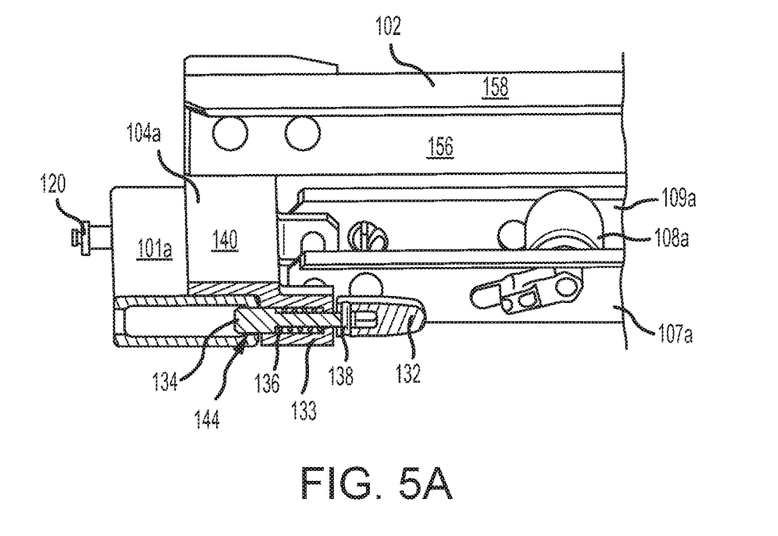
FIG. 5A illustrates a cross-section view of a locking system in a locked position, in accordance with various embodiments.

FIG. 5A illustrates locking system 130a in a locked position, in accordance with various embodiments. In the locked position, plunger 134 is located in first track 101a, pin 138 is located proximate spring envelope 133, and spring 136 is in an uncompressed position. In the locked position, first end mounting bracket 104a is securely coupled to first track 101a, such that first end mounting bracket 104a may not translate along first track. Stated differently, locking system 130a is configured to prevent translation of first end mounting bracket 104a in directions parallel to first track 101a. With momentary reference to FIG. 4A, keyholes 122 and heads 190 of first protrusions 120 may be configured to restrict horizontal movement of first end mounting bracket 104a relative first track 101a. For example, a diameter of the heads 190 may be greater than a diameter of keyholes 122. Restraining or preventing translation parallel to first track 101a may reduce or prevent occurrences of first protrusions 120 inadvertently be removed from keyholes 122, with momentary reference to FIG. 3B.

Figure 5B:
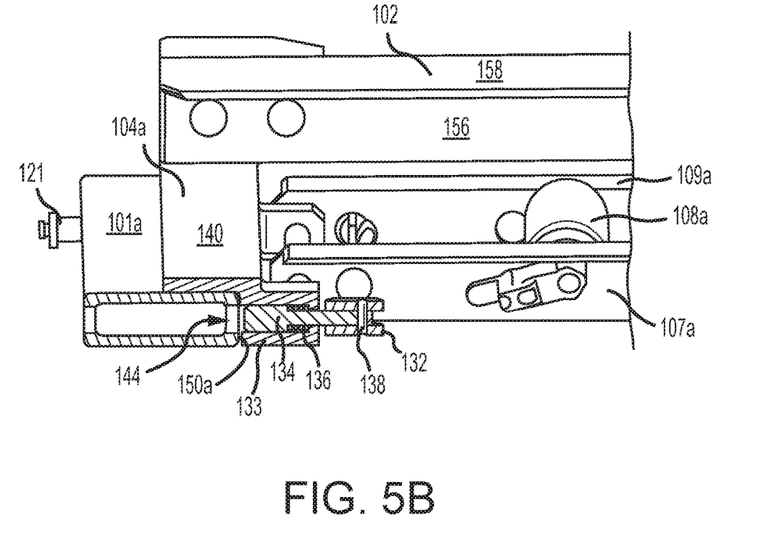
FIG. 5B illustrates a cross-section view of a locking system in an unlocked position, in accordance with various embodiments.

FIG. 5B illustrates locking system 130a in an unlocked position, in accordance with various embodiments. In the unlocked position, lever 132 is actuated causing pin 138 to translate away from spring envelope 133, thereby pulling, or translating plunger 134 into spring envelope 133 and out of first track 101a. Translation of plunger 134 into spring envelope 133 may cause spring 136 to compress. In the unlocked position, spring 136 may apply a biasing force to plunger 134. Spring 136 may thus bias plunger 134 toward first track 101a. outside first track 101a (i.e., over first surface 150a). Once plunger 134 clears first surface 150a of first track 101a, first end mounting bracket 104a may be translated in directions parallel to first track 101a. In this regard, to remove first protrusions 120 from keyholes 122, with momentary reference to FIG. 3B, locking system 130a may need to be placed in the unlocked position.

Integrated side guide roller tray assemblies 100 may thus be quickly and easily adapted to accept different sized ULDs, for example, ULDs 92 and ULDs 94 shown in FIG. 2B. Coupling roller trays 106 and guide rail 102 to end mounting brackets 104 allows roller trays 106 and guide rail 102 to be positioned along and coupled to tracks 101 together. In this regard, the rollers 108 within roller trays 106 are located proximate guide rail 102, and thus proximate the outboard edge of the ULD, regardless of where along tracks 101 guide rail 102 is positioned. In this manner, cargo management system 90 may accept and support different sized ULDs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system.

However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated side guide roller tray assembly for a cargo management system, comprising:
    a guide rail;
    a first end mounting bracket coupled to a first end of the guide rail;
    a second end mounting bracket coupled to a second end of the guide rail opposite the first end;
    a first roller tray coupled to the first end mounting bracket, the first roller tray comprising a first roller; and
    a mid-mounting bracket coupled to the first roller tray and the guide rail, wherein the mid-mounting bracket is located half-way between the first end mounting bracket and the second end mounting bracket.

2. The integrated side guide roller tray assembly of claim 1, further comprising a second roller tray coupled to the second end mounting bracket and the mid-mounting bracket, the second roller tray comprising a second roller.

3. The integrated side guide roller tray assembly of claim 1, wherein the first end mounting bracket defines a first keyhole, and the second end mounting bracket defines a second keyhole.

4. The integrated side guide roller tray assembly of claim 1, wherein the first end mounting bracket comprises a locking system, the locking system including a plunger configured to translate relative to the first end mounting bracket and in a direction parallel to the guide rail.

5. The integrated side guide roller tray assembly of claim 4, wherein the locking system further comprises:
    a spring configured to apply a biasing force to the plunger; and
    a lever operationally coupled to the plunger, wherein the lever is configured such that actuation of the lever translates the plunger.

6. The integrated side guide roller tray assembly of claim 1, wherein the first roller tray comprises an outer rail and an inner rail.

7. The integrated side guide roller tray assembly of claim 6, further comprising a securement pin coupling the first roller tray to the first end mounting bracket, the securement pin comprising:
    a shaft portion located through the outer rail of the first roller tray, the inner rail of the first roller tray, and a flange of the first end mounting bracket; and
    a lip portion located through the outer rail and on a surface of the outer rail, wherein the surface of the outer rail is oriented toward the inner rail.

8. A cargo management system, comprising:
    a first track;
    a second track parallel to the first track;
    a first integrated side guide roller tray assembly extending between the first track and the second track, the first integrated side guide roller tray assembly comprising:
        a first guide rail;
        a first end mounting bracket coupled to a first side of the first track and to a first end of the first guide rail;
        a second end mounting bracket coupled to a first side of the second track and to a second end of the first guide rail opposite the first end of the first guide rail; and
        a first roller tray coupled to the first end mounting bracket, the first roller tray comprising a first roller;
    a third track parallel to the first track and the second track; and
    a second integrated side guide roller tray assembly extending between the first track and the third track, the second integrated side guide roller tray assembly comprising:
        a second guide rail;
        a right end mounting bracket coupled to a first end of the second guide rail and to a second side of the first track opposite the first side of the first track;
        a left end mounting bracket coupled to a first side of the third track and to a second end of the second guide rail opposite the first end of the second guide rail; and a second roller tray coupled to the right end mounting bracket, the second roller tray comprising a second roller.

9. The cargo management system of claim 8, further comprising:
a first protrusion extending from the first side of the second track and located through a first keyhole defined by the first end mounting bracket of the first integrated side guide roller tray assembly; and
a second protrusion extending from the second side of the first track and located through a keyhole defined by the right end mounting bracket of the second integrated side guide roller tray assembly.

10. The cargo management system of claim 8, further comprising a third track parallel to the first track and located between the first track and the second track, wherein the first integrated side guide roller tray assembly further comprises a mid-mounting bracket coupled to the first roller tray and to the third track.

11. The cargo management system of claim 10, further comprising
a first protrusion extending from a first side of the third track and located through a first keyhole defined by the mid-mounting bracket; and
a second protrusion extending from a second side of the third track opposite the first side of the third track, wherein the second protrusion is located through a second keyhole defined by the mid-mounting bracket.

12. The cargo management system of claim 11, wherein the first integrated side guide roller tray assembly further comprises a second roller tray coupled to the second end mounting bracket and the mid-mounting bracket, the second roller tray including a second roller.

13. The cargo management system of claim 8, wherein the first end mounting bracket further comprises a locking system including a plunger configured to translate in and out an opening defined by the first track.

14. The cargo management system of claim 13, wherein the locking system further comprises:
a spring configured to apply a biasing force to the plunger; and
a lever configured to actuate the plunger.

15. An integrated side guide roller tray assembly, comprising:
a guide rail;
a first mounting bracket coupled to the guide rail, wherein the first mounting bracket defines a first keyhole, and wherein the first mounting bracket comprises a locking system including a plunger configured to translate relative to the first mounting bracket; and
a roller tray coupled to the first mounting bracket, the roller tray comprising a roller.

16. The integrated side guide roller tray assembly of claim 15, further comprising:
a second mounting bracket coupled to the guide rail; and
a third mounting bracket coupled to the guide rail and located half way between the first mounting bracket and the second mounting bracket.

17. The integrated side guide roller tray assembly of claim 16, wherein a width of the third mounting bracket is greater than a width of the first mounting bracket.

\* \* \* \* \*